UNITED STATES PATENT OFFICE.

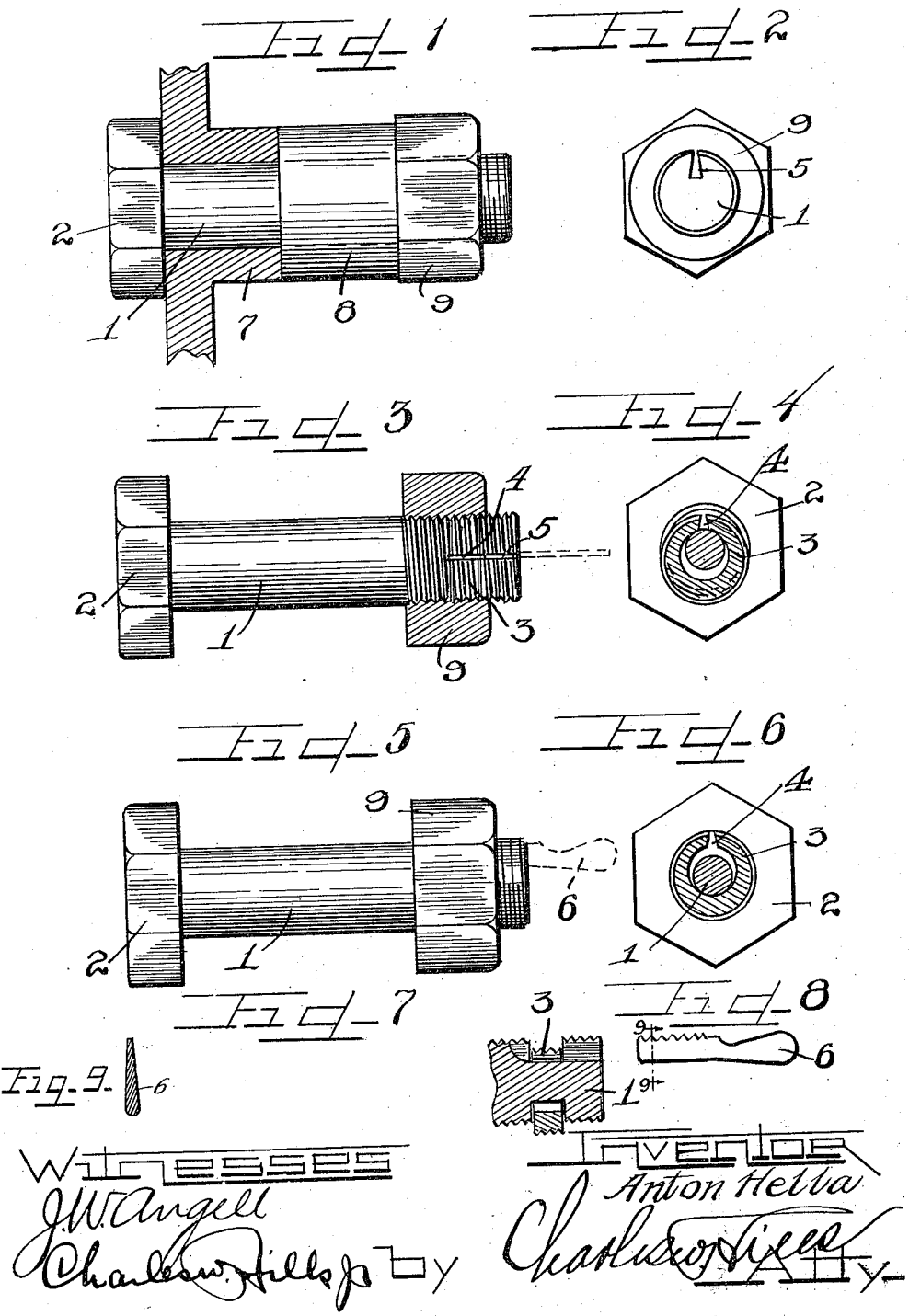

ANTON HELLA, OF CHICAGO, ILLINOIS.

NUT-LOCK.

1,140,037.        Specification of Letters Patent.        Patented May 18, 1915.

Application filed March 21, 1913. Serial No. 755,863.

*To all whom it may concern:*

Be it known that I, ANTON HELLA, citizen of the United States, and a resident of the city of Chicago, in the county of Cook and State of Illinois, have invented certain new and useful Improvements in Nut-Locks; and I do hereby declare that the following is a full, clear, and exact description of the same, reference being had to the accompanying drawings, and to the numbers of reference marked thereon, which form a part of this specification.

A number of means have been devised for the purpose of locking nuts upon the threaded bolts therefor, and usually such locking devices have formed a part of, or have existed as, an attachment for the nut, thereby necessitating a specially constructed nut. Furthermore the nuts in some cases can only be locked when they have been advanced to a certain position on the bolts. In other cases wherein the nut may be locked in any position on the bolt, the locking means usually constitutes a set screw adapted to engage the threads of the bolt, which is bad practice, inasmuch as such tends to bur the threads, with a consequent difficult movement of the nut thereon.

This invention relates to means for locking a nut upon a threaded bolt whereby the nut may be locked in any position, and only released by the insertion of a key.

It is an object of this invention to provide a specially constructed bolt, whereby a nut may be locked in practically any position thereon, and may only be loosened or moved when a key is inserted in the bolt.

It is also an object of this invention to provide a threaded bolt having a plurality of threads on a loosely engaged locking member which may only be held in release position by means of a proper key.

It is also an object of this invention to provide locking means on a bolt, whereby an attempt to remove a nut therefrom without the insertion of a key tends only to further tighten the nut upon the bolt.

It is also an object of this invention to provide a threaded bolt having a loose threaded portion thereon which may be moved into proper register with the stationary portion to afford a continuous series of threads, permitting a nut to be threaded on or off the same.

It is also an object of this invention to provide a threaded bolt with a loose locking threaded portion thereon adapted to be held in release position by means of a notched key, said notches being of the same pitch as the screw threads on the bolt.

It is furthermore an object of this invention to provide a bolt with a locking member for a nut, which may be moved into release position by means of a notched key, notched and tapered to fit the particular locking member of said bolt.

It is finally an object of this invention to provide a device wherein the locking means is constantly associated with the bolt and may not be removed therefrom, except by destruction of the same.

Other objects of the invention will be evident from the description.

The invention (in a preferred form) is illustrated in the drawings, and hereinafter more fully described.

In the drawings: Figure 1 is a fragmentary front elevation partly in section, showing a bolt with a nut locked thereon. Fig. 2 is an end elevation thereof. Fig. 3 is an elevation of a bolt equipped with a device embodying my invention, and with a sectioned nut shown threaded thereon and locked from removal. Fig. 4 is an end view of the bolt with the nut removed, and showing the bolt and locking member in section. Fig. 5 is a front elevation of a bolt having a nut lock thereon, and showing a key inserted therein to permit adjustment of the nut. Fig. 6 is a transverse section through the bolt showing a locking member in release position. Fig. 7 is a fragmentary, longitudinal section through said bolt and locking member, showing the position of a locking member, when not held in release register by a key, and without a nut threaded on the bolt. Fig. 8 is a view showing the construction of a key. Fig. 9 is a section on line 9—9 of Fig. 8.

As shown in the drawings: 1, indicates an ordinary threaded bolt provided with the integral hexagonal head 2. The bolt is threaded, as is usual, at the extremity opposite said head 2, and is further provided with a peripheral groove or recess, as shown more clearly in Fig. 7, and has sprung therein a split ring or locking member 3, the outside diameter of which is the same as that of the bolt, and which is likewise provided with threads adapted to register with the threads on the bolt. The circular aperture through said locking ring 3, as shown more clearly in Figs. 4 and 6 is formed eccentrically therein and is of slightly larger diameter than the reduced portion of the bolt, thus permitting the locking ring 3, to drop into a lower position, such as shown in Fig. 4, when unengaged either by a nut or key, and when in such position, of course, a nut threaded on the bolt inwardly beyond the position of the locking member cannot possibly be unthreaded, owing to the fact that the outer surface of the nut would abut against the low projecting surface of the locking member. The ring 3, is provided with a tapered slot 4, on the narrow side thereof, which is adapted to register with a similar slot 5, in the bolt, when the ring is in release position. A tapered key 6, having notches therein conforming in outline to the particular shape and size of the threads on the bolt is provided for the purpose of retaining the locking member 3, in registering or release position, when such is the case said key extends through said alined slots 4, and 5.

The operation is as follows: Fig. 1 shows the bolt in operative position with the head 2, thereof engaged on one side of any suitable apertured support 7, and having a collar or any element 8, pivotally mounted thereon adjacent said support. A nut 9, is shown threaded on the bolt, and held in locking position by means of the threaded locking ring heretofore described. When it is desired to remove the nut from the bolt, the nut 9 is forced around a small distance required to bring the slots in the ring 3, and bolt 1, into proper registering position, and held in such position by the key 6, while the nut is readily threaded from the bolt. Likewise when the nut is to be mounted upon the bolt, the key is first inserted to engage the slots 4, and 5, of the ring and bolt respectively, whereupon the nut may be easily threaded upon the continuous threaded shank thereby afforded until the desired position is reached, and the key is then withdrawn. Any attempt to move the nut upon the bolt, due to the fact that the ring member 3, is free to rotate with the nut, will advance the ring a trifling amount, and the same will then be stopped or jammed against the wall of the recess in the bolt, and such slight movement serving to throw the threaded portions of the ring and bolt respectively out of register, thereby preventing further rotation of the nut in the same direction.

It is obvious that the only function of the key is to support and retain the ring member from rotation in proper registering position, and consequently the key may be constructed without the notches or teeth in the upper edge thereof, and made only of a depth to project upwardly in the slots 4, and 5, to the base of the threads, so as not to interfere with the threading of a nut on or off the bolt.

It is obvious that the slotted portion of the ring member and bolt may be made of such a suitable configuration as to receive only a peculiarly shaped key, such that the nut upon the bolt may only be adjusted by one in possession of such key.

I am aware that details of construction may be varied to a wide range without departing from the principles of this invention, and I therefore do not purpose limiting the patent granted otherwise than within the scope of the appended claims.

I claim as my invention:

1. In a device of the class described a threaded bolt, an eccentrically and loosely mounted threaded split ring thereon adapted when the thread thereon is out of register with the threads on the bolt to prevent movement of a nut on said bolt.

2. In a device of the class described a fixed threaded member, and a loose threaded ring member of the same outer diameter thereon adapted when the thread thereof is out of register with the thread of said fixed member to prevent movement of a nut on said fixed member.

In testimony whereof I have hereunto subscribed my name in the presence of two subscribing witnesses.

ANTON HELLA.

Witnesses:
CHARLES W. HILLS, Jr.
LEON M. REIBSTEIN.

Copies of this patent may be obtained for five cents each, by addressing the "Commissioner of Patents, Washington, D. C."